(12) United States Patent
Uenaka et al.

(10) Patent No.: US 7,450,820 B2
(45) Date of Patent: Nov. 11, 2008

(54) VIDEO SIGNAL RECORDING/PLAYBACK APPARATUS, VIDEO SIGNAL PLAYBACK APPARATUS, AND METHOD OF RECORDING AND PLAYING BACK VIDEO SIGNALS

(75) Inventors: Hiroko Uenaka, Osaka (JP); Shuichi Isota, Osaka (JP); Seiichi Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 10/607,784

(22) Filed: Jun. 27, 2003

(65) Prior Publication Data

US 2004/0096190 A1 May 20, 2004

(30) Foreign Application Priority Data

Nov. 19, 2002 (JP) .............................. 2002-334821

(51) Int. Cl.
- H04N 5/91 (2006.01)
- H04N 7/00 (2006.01)
- H04N 9/79 (2006.01)
- H04N 5/00 (2006.01)

(52) U.S. Cl. .............................. 386/95; 386/65; 386/45; 386/46; 386/125; 386/126

(58) Field of Classification Search ..................... 386/1, 386/45, 46, 65, 95, 125–126; 368/82
See application file for complete search history.

(56) References Cited

U.S. PATENT DOCUMENTS

| | | | |
|---|---|---|---|
| 5,701,383 A | | 12/1997 | Russo et al. |
| 5,748,568 A | * | 5/1998 | Harrison ...................... 368/82 |
| 6,275,450 B1 | * | 8/2001 | Makiba ........................ 368/80 |
| 6,542,695 B1 | * | 4/2003 | Akiba et al. ................. 386/125 |
| 6,744,967 B2 | * | 6/2004 | Kaminski et al. ............. 386/46 |
| 7,043,135 B2 | * | 5/2006 | Yamamoto ................... 386/46 |
| 7,218,837 B2 | * | 5/2007 | Goto et al. ..................... 386/68 |
| 2002/0191951 A1 | * | 12/2002 | Sodeyama et al. ............ 386/46 |

FOREIGN PATENT DOCUMENTS

| | | |
|---|---|---|
| JP | 2000-228756 | 8/2000 |
| JP | 2001-292422 | 10/2001 |

* cited by examiner

*Primary Examiner*—Thai Tran
*Assistant Examiner*—Daquan Zhao
(74) *Attorney, Agent, or Firm*—RatnerPrestia

(57) ABSTRACT

A video signal recording/playback apparatus displays a current playback position as a time difference from a current recording position in a simple form. The video signal recording/playback apparatus displays the playback position together with an entire scheduled recording time as a frame, thus allowing a user to acknowledge the current playback position with the current recording time.

12 Claims, 8 Drawing Sheets

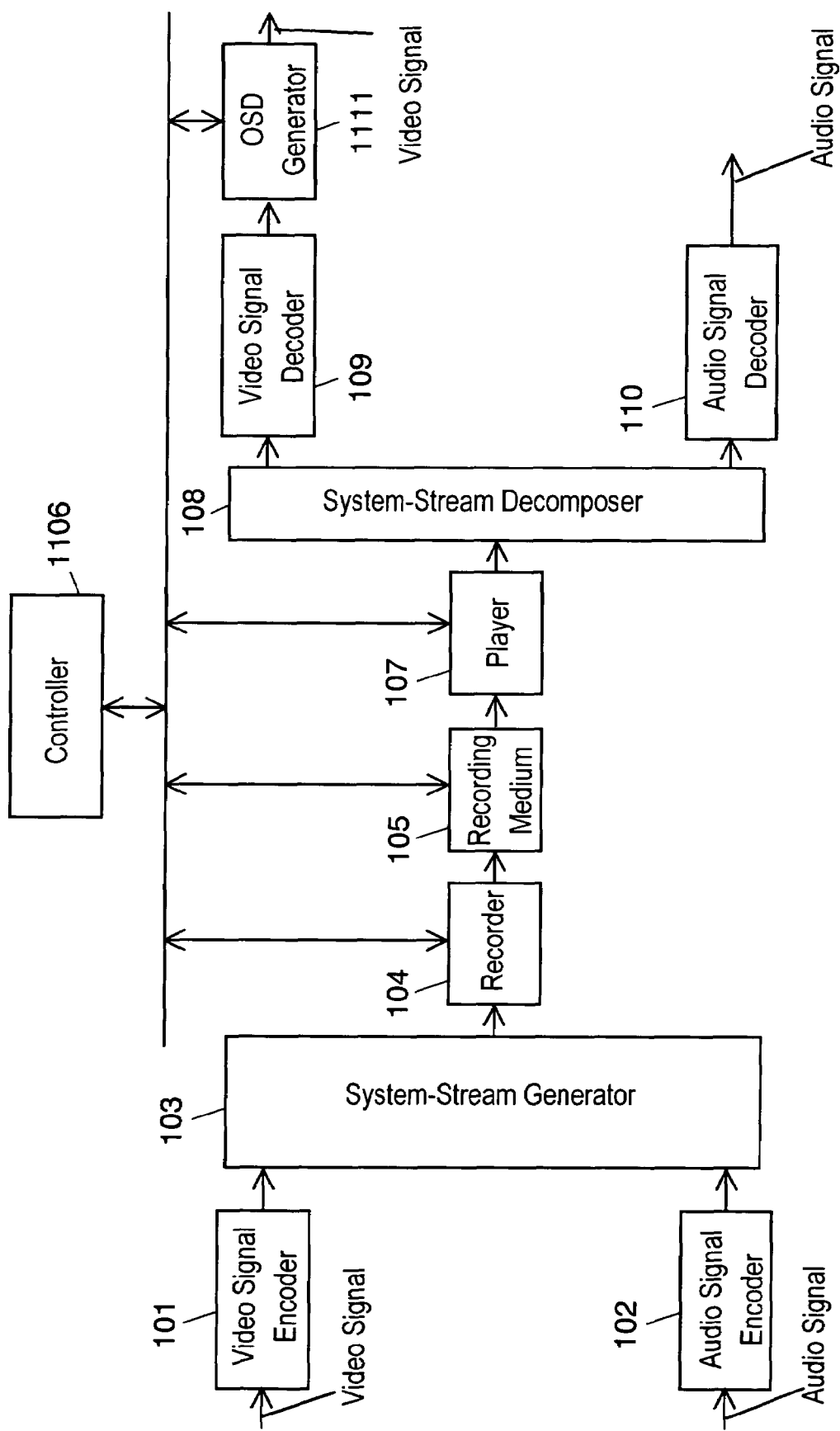

VIDEO SIGNAL RECORDING/PLAYBACK APPARATUS, VIDEO SIGNAL PLAYBACK APPARATUS, AND METHOD OF RECORDING AND PLAYING BACK VIDEO SIGNALS

FIELD OF THE INVENTION

The present invention relates to a video signal recording/playback apparatus for recording and playing back video signals in a recording medium, a video signal playback apparatus for playing back video signals received from a server, and a method of recording and playing back video signals.

BACKGROUND OF THE INVENTION

A conventional video signal recording/playback apparatus and a conventional method of recording and playing back video signals will be explained referring to FIGS. 6 to 8.

FIG. 8 is a block diagram of the conventional video signal recording/playback apparatus. The conventional video signal recording/playback apparatus includes encoders 101 and 102, a system-stream generator 103, a recorder 104, a controller 1106, a player 107, a system-stream decomposer 108, decoders 109 and 110, and an on-screen-display (OSD) generator 1111. A recording medium 105 is a recordable digital versatile disk (DVD).

In the conventional video signal recording/playback apparatus, a digital video signal is received by the encoder 101 for high-efficiency-encoding it into a video bit stream in the MPEG-2 standard. Similarly, a digital audio signal is received by the encoder 102 for high-efficiency-encoding it into an audio bit stream in the MPEG-1 standard.

The video bit stream and the audio bit stream are transferred to the system-stream generator 103 for combining them to form a system stream of MPEG-2 packets conforming to sectors of the DVD.

The system stream is then recorded by the recorder 104 on a predetermined location of the recording medium 105 determined by the controller 1106.

In a time-shifting playback mode, while being recording in the recording medium 105, the video signal is played back from a recorded portion before the current recording position. More specifically, the player 107 reads out the system stream from the position of the recording medium 105 determined by the controller 1106.

The system stream of the MPEG-2 standard is then transferred to the system-stream decomposer 108 for dividing it into a video bit stream and an audio bit stream.

The video bit stream is input to the decoder 109 for high-efficiency-decoding it in MEG-2 into a video signal.

The audio bit stream is input to the decoder 110 for high-efficiency-decoding it in MEG-1 into an audio signal.

The video signal is then transferred to the OSD generator 1111 for adding a window, which is a data display, to the video signal in an alpha-blending format, in which the window being partially transparent overlaps a frame of the video signal at any location in the frame. The OSD generator 1111 may provide a window which appears at a corresponding location on a display screen as replacing an image on the screen. While the shape of the window can arbitrarily be determined, FIG. 6 illustrates of the window having a rectangular shape.

An item displayed in the window will be explained referring to FIGS. 6 and 7. FIG. 6 shows an item displayed in the window by the conventional video signal recording/playback apparatus. FIG. 7 is a flowchart of displaying a time in the apparatus.

Numerals shown at an upper left and a lower left of the window shown in FIG. 6 represent a recording time and a playback time both expressed in hours, minutes, and seconds from the start of recording. As shown in the flowchart of FIG. 7, the recording time (RecTime) and the playback time (PlayTime) are received from the controller 1106 and displayed over the screen image of the video signal by the OSD generator 1111. The window indicates the recording time and a playback position.

The window 1006 shown in FIG. 6 has a four-sided frame 1007 for indicating the entire recordable length of a disk. A hatching 1008 in the frame 1007 represents a recorded portion of the disk indicating the currently-recording (time) location at the right end.

The current playback position on the disk is indicated by a triangle mark 1009 under the frame 1007. The top vertex of the triangle 1009 indicates the current playback position on the disk.

The window shown in FIG. 6 may generally appear near a corner of the image screen of a display (not shown).

The conventional video signal recording/playback apparatus disclosed in Japanese Patent Laid-Open Publication No.2000-228756 can display the current playback position in a playback mode for playing back a recorded video signal but not in the time-shifting playback mode.

In the conventional video signal recording/playback apparatus, a playback time from the start is constantly displayed in hours, minutes, and seconds using a number of digits and thus is hardly confirmed by a user. Since the conventional video signal recording/playback apparatus displays the current playback position out of the entire length of a recording area, the relationship between the current recording position and the current playback position is hardly recognized.

SUMMARY OF THE INVENTION

A video signal recording/playback apparatus includes a recorder for recording a video signal in a recording medium, a player for playing back the video signal at a playback position in the recording medium while the recorder records a recording position of the video signal in the recording medium, a controller for calculating a time difference between the recording position and the playback position, and an on-screen display (OSD) generator for generating and displaying the time difference with the played video signal. The OSD generator displays the time difference in a unit of seconds if the difference is less than one minute, displays the time difference in a unit of minutes if the difference is less than 60 minutes and not less than 60 seconds, and displays the time difference in a unit of hours if the difference is not less than 60 minutes.

BRIEF DESCRIPTION OF THE DRAWINGS

FIG. 8 is a block diagram of the conventional video signal recording/playback apparatus.

DETAILED DESCRIPTION OF THE PREFERRED EMBODIMENTS (Embodiment 1)

Figure 1:
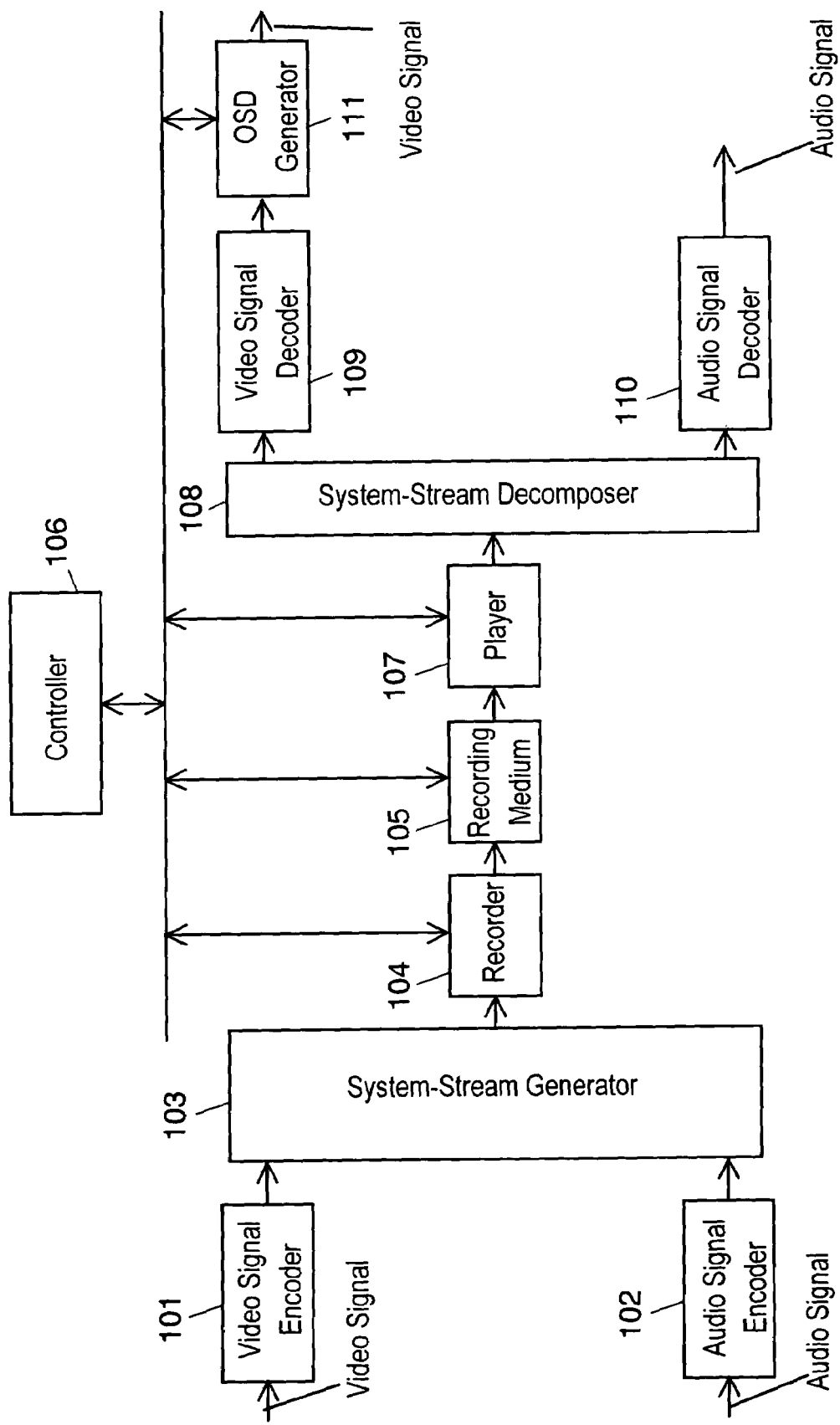
FIG. 1 is a block diagram of a video signal recording/playback apparatus according to exemplary embodiment 1 of the present invention.
Figure 2:
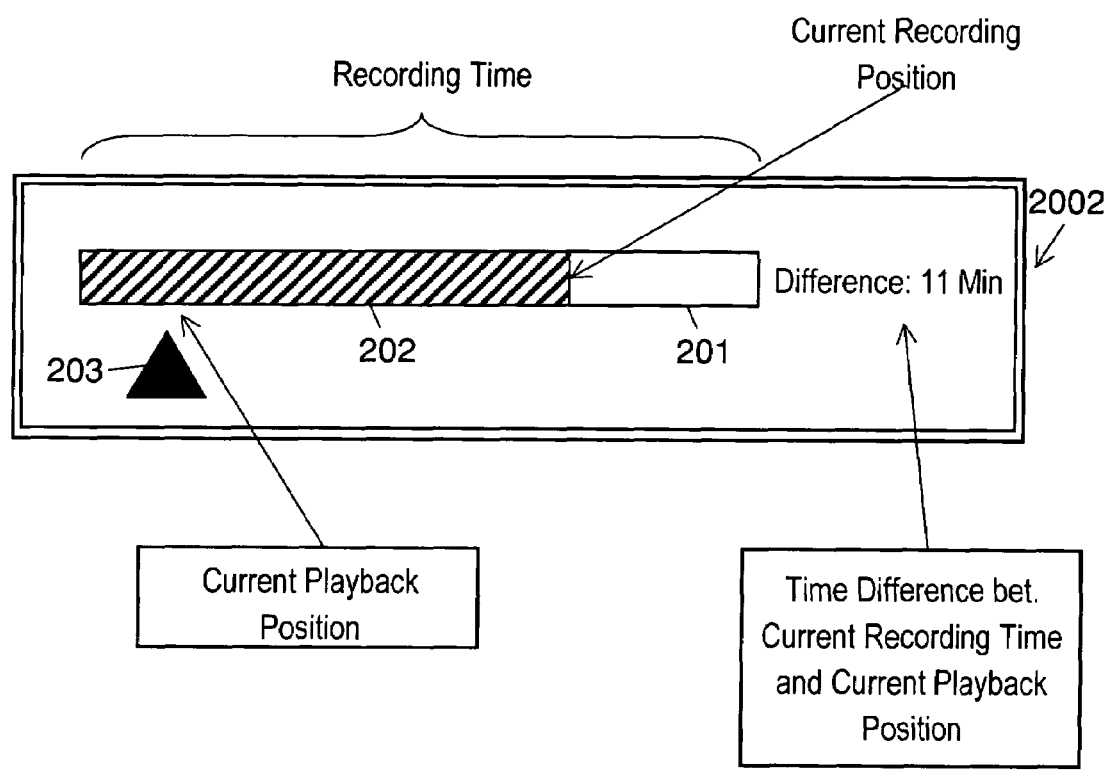
FIG. 2 illustrates an item displayed in a window of the video signal recording/playback apparatus according to embodiment 1.
Figure 3:
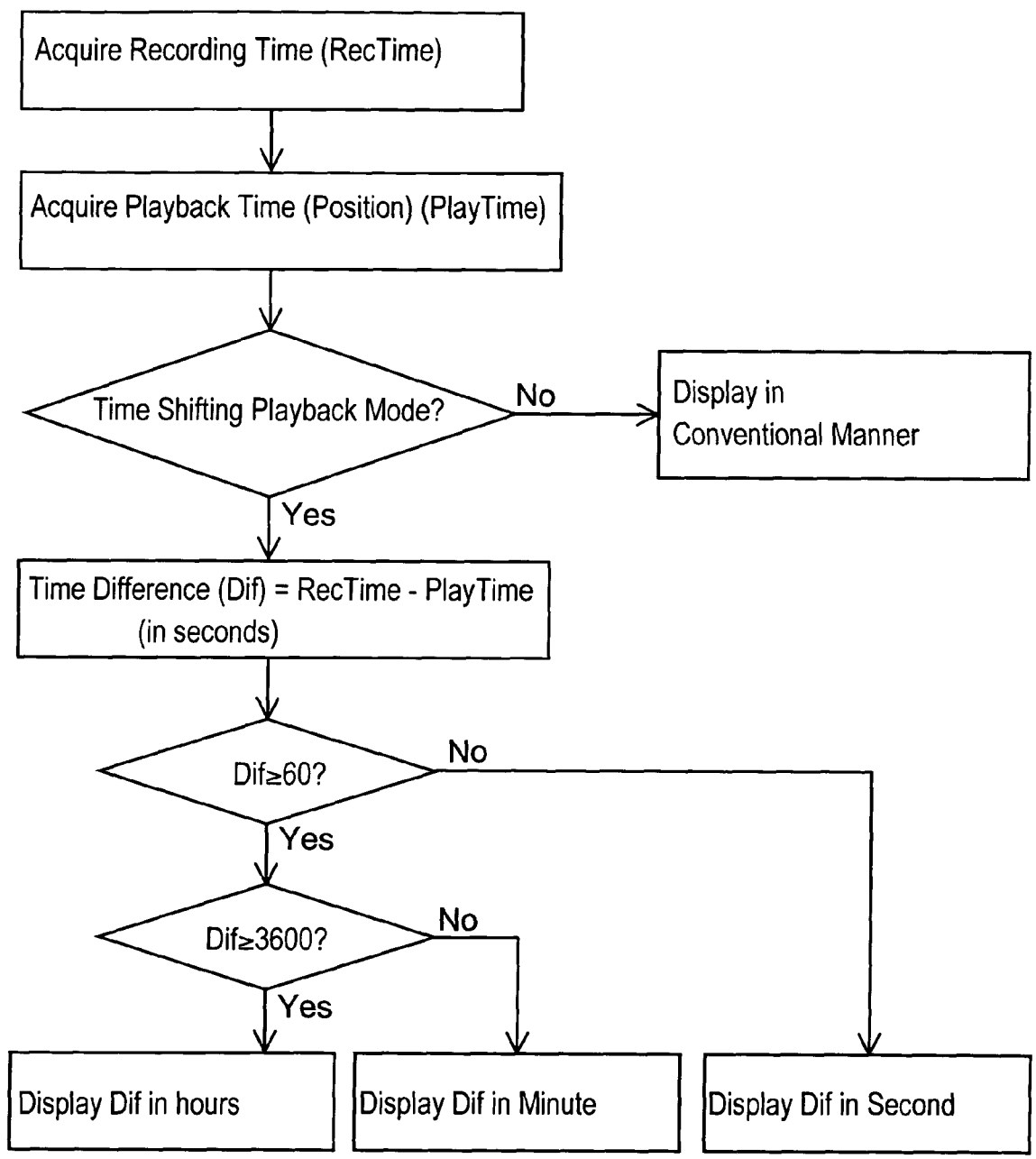
FIG. 3 is a flowchart for producing a time displayed on the video signal recording/playback apparatus according to embodiment 1.

FIG. 1 is a block diagram of a video signal recording/playback apparatus according to exemplary embodiment 1 of the present invention. FIG. 2 illustrates a window 200 of the video signal recording/playback apparatus of embodiment 1. FIG. 3 is a flowchart of determining a time displayed by the video signal recording/playback apparatus of embodiment 1. Like components illustrated in the block diagram of FIG. 1 are denoted by like numerals of those of the conventional video signal recording/playback apparatus and will be explained in no more detail.

As shown in the flowchart of FIG. 3, a controller 106 receives and displays a recording time (RecTime) and a playback time (PlayTime) by an OSD generator 111. When the video signal recording/playback apparatus is not in a time-shifting playback mode, the reading time and the playback time appear in the same manner as the conventional apparatus.

When the video signal recording/playback apparatus is in the time-shifting playback mode, the controller 106 calculates a difference between the recording time and the playback time, and the OSD generator 111 displays the difference as shown in FIG. 2.

In the calculation, the recording position (recording time) and the playback position (playback time) are received, and a deference between the positions is calculated in the time-shifting playback mode. When being less than 60 seconds, the difference is displayed in the unit of seconds. When being less than 60 minutes and not less than one minute, the difference is displayed in the unit of minutes. When being not less than 60 minutes, the difference is displayed in the unit of hours. When the apparatus is not in the time-shifting playback mode, the difference is expressed in hours, minutes, and seconds (hh:mm:ss) in a conventional manner.

FIG. 2 illustrates "Difference: 11 min." at the right side of the frame indicating a time difference between the current recording position and the current playback position. The difference is expressed in seconds if being less than one minute, is expressed in minutes if being less than 60 minutes and not less than 60 seconds, and is expressed in hours if being not less 60 minutes.

The display "11 minutes difference" in FIG. 2 indicates that the time difference between the current recording position and the current playback position is between 11 minutes 00 second and 11 minutes 59 seconds.

The display is not limited to this example but may represent a predetermined offset value, that is, for example, The display "11 minutes difference" may indicate that the difference ranges from 10 minutes 30 seconds to 11 minutes 30 seconds.

The video signal recording/playback apparatus of embodiment 1 can be set with a scheduled recording time. When the scheduled recording time is preset, the apparatus automatically starts recording, for example, two hours of a desired program in a common recording mode. A frame 201 shown in FIG. 2 indicates the entire length of the scheduled recording time. A hatching 202 in the frame 201 represents a recorded duration from the start of the recording and the current time at the right end. The current playback position on the disk is indicated by a triangle mark 203 under the frame 201. The top vertex of the triangle 203 indicates the current playback position in the playback operation.

As described, the video signal recording/playback apparatus of embodiment 1 allows the current time in the playback operation to be expressed as a difference from the current time of the recording operation and displayed in a simple form of time steps, hence notifying a user of the current playback position easily.

The apparatus of embodiment 1 provides a display of the entire length of the scheduled recording time with the current recording position and the current playback position. This display allows the user to acknowledge the recorded duration from the start of recording and the playing-back duration easily.

The display in the window explained according to embodiment 1 is just an example and may contain other information, such as a recording rate, a system status, or preset parameters.

While the frame is provided according to embodiment 1 for displaying the entire length of the scheduled recording time, the frame may be replaced by a meter, such as a line, with a mark indicating the current recording position.

While the window of a horizontally-longitudinally rectangular shape indicates the time advancing from the left to the right according to embodiment 1, the time display may be started from the right to the left. Alternatively, the window of the rectangular shape may extending vertically with the time advancing from the upper to the lower or from the lower to the upper.

In the time shifting playback mode, the playing back may be speeded up or skipped some unwanted parts, thus corresponding to a catch-up playback operation at a speed larger than a average playback speed.

While the video and audio signals are encoded before recorded and decoded for playback in the apparatus of embodiment 1, an analog form of the signals, such as video tape recorder signals, may not be encoded or decoded, and playback signals of them may directly overlap the window produced by the OSD generator.

Moreover, while both the video and audio signals are processed for recording and playback in the apparatus of embodiment 1, they may be recorded and played back separately from each other.

The recording medium is not limited to the DVD but may be other recording medium, such as a tape, a hard disk drive (HDD), or a memory, which needs no mechanical motion.

(Embodiment 2)

Figure 4:
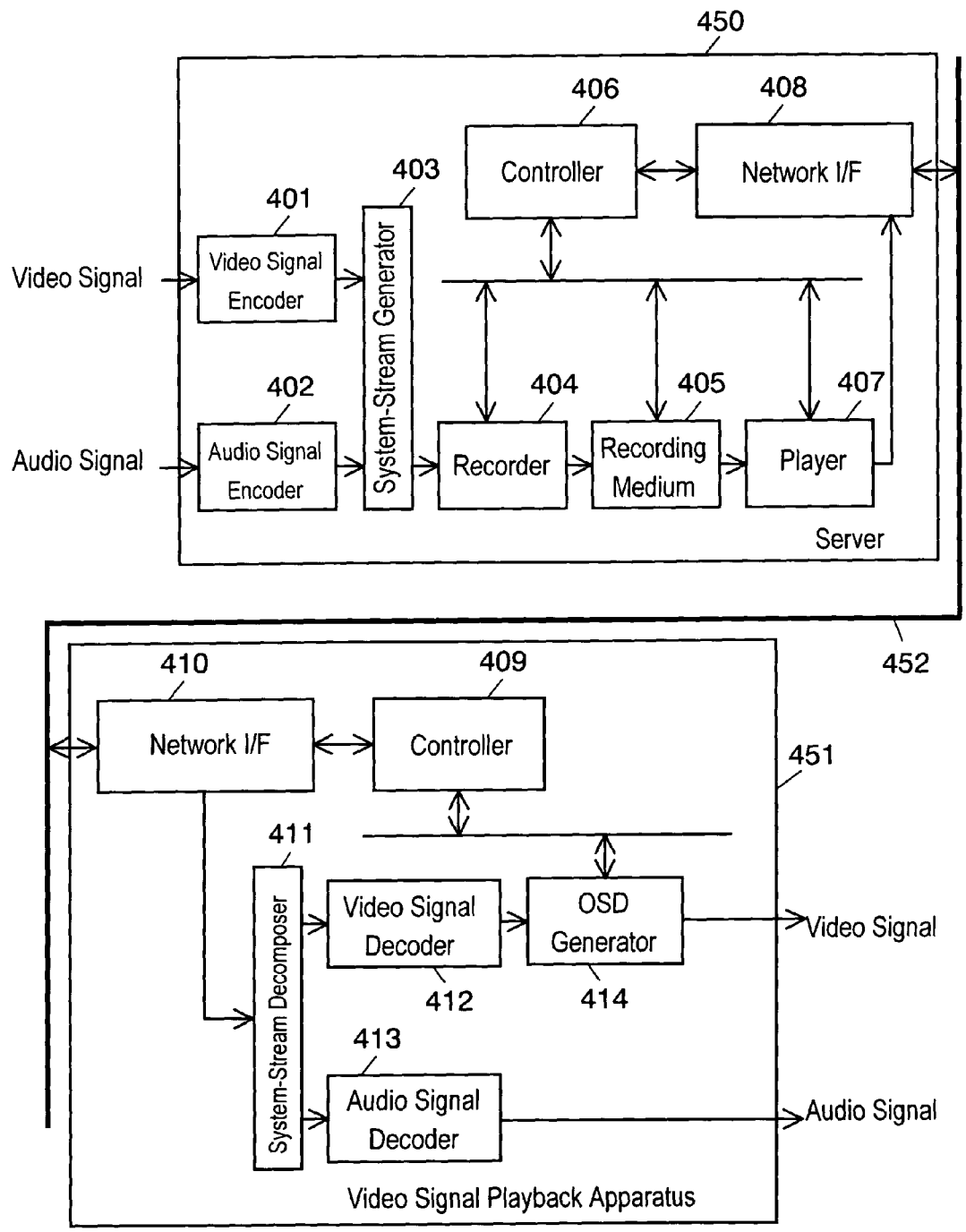
FIG. 4 is a block diagram of a video signal player apparatus and a server according to exemplary embodiment 2 of the invention.
Figure 5:
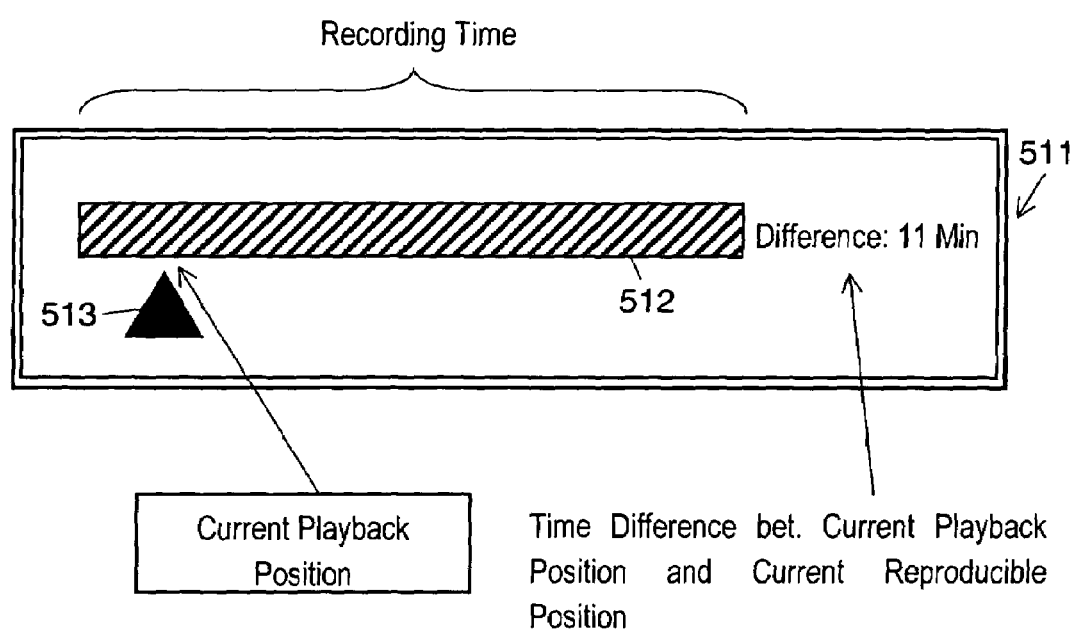
FIG. 5 illustrates an item displayed in a window on the video signal player apparatus according to embodiment 2.
Figure 6:
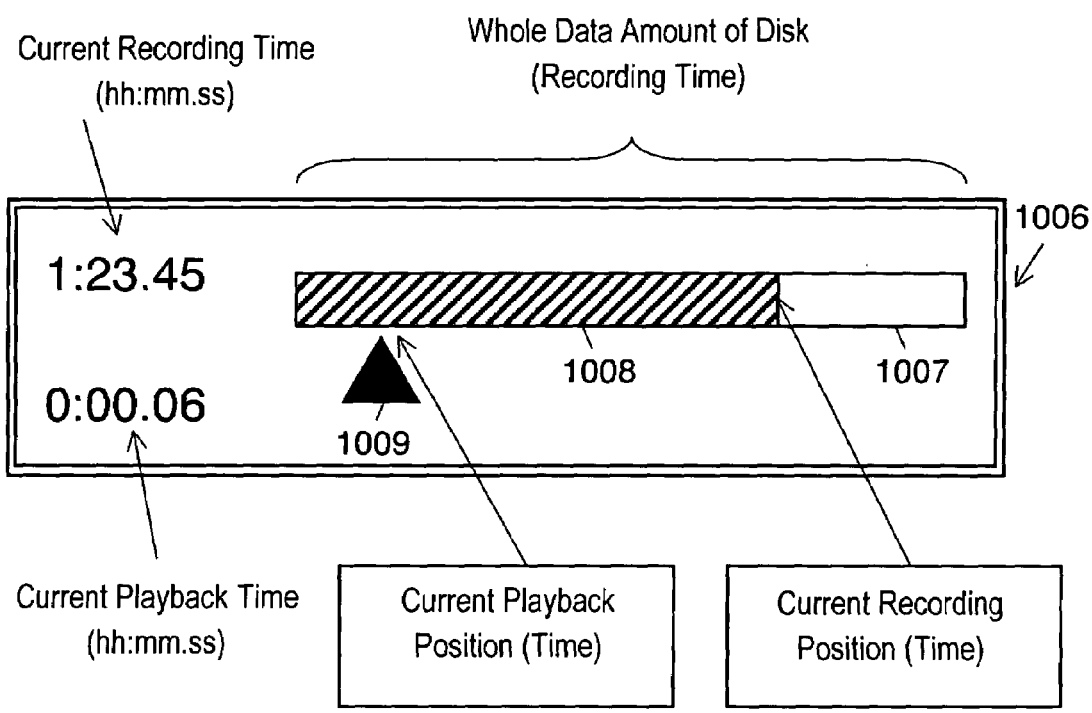
FIG. 6 illustrates an item displayed in a window of a conventional video signal recording/playback apparatus.
Figure 7:
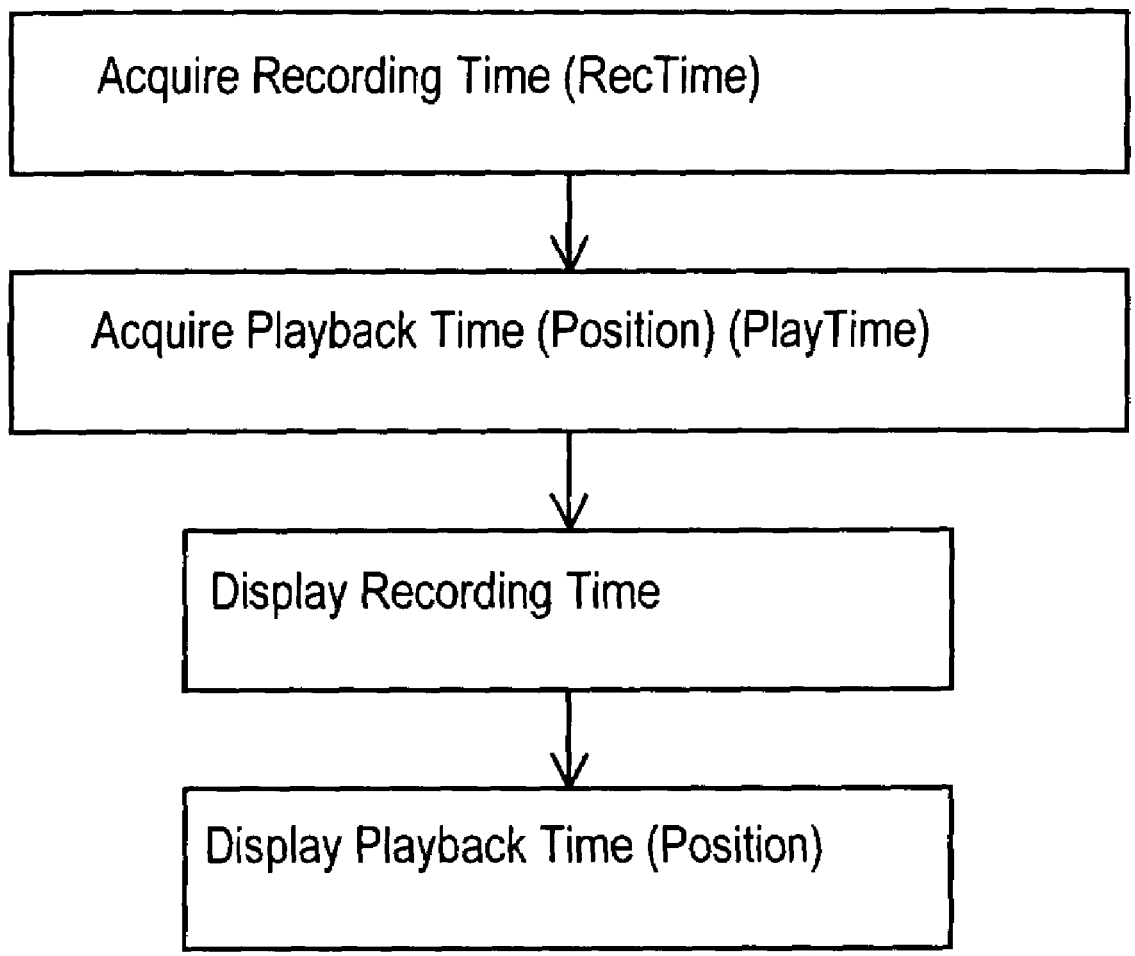
FIG. 7 is a flowchart for producing a time displayed by the conventional video signal recording/playback apparatus.

FIG. 4 is a block diagram of a video signal recording/playback system according to exemplary embodiment 2 of the present invention. FIG. 5 illustrates an item displayed in a window 511 provided by the video signal recording/playback system of embodiment 2. The video signal recording/playback system of embodiment 2 includes a server 450 as an external apparatus, a video signal playback apparatus 451, and a network 452 linking the server 450 and the video signal playback apparatus 451. The server 450 includes encoders 401 and 402, a system-stream generator 403, a recorder 404, a recording medium 405, a controller 406, a player 407, and a network interface 408. The recording medium 405 may preferably be a digital versatile disk (DVD). The video signal playback apparatus 451 includes a controller 409, a network interface 410, a system-stream decomposer 411, decoders 412 and 413, and an on-screen-display (OSD) generator 414.

The server 450 according to embodiment 2 converts a video signal or both video and audio signals into predetermined forms for transmission to a target terminal through the network using an IP protocol or a radio transmission protocol.

An operation of the server 450 will be explained in more detail.

The encoder 401 receives and high-efficiently-encodes a digital video signal into a video bit stream of the MPEG-2 standard.

A digital audio signal is received by the encoder 402 for high-efficiently-encoding the signal into an audio bit stream of the MPEG-1 standard.

The video bit stream and the audio bit stream are transferred to the system-stream generator 403 for combining them to produce a system stream of MPEG-2 packets allocated to sectors of the DVD.

The system stream is then received by the recorder 404 for recording the stream in a predetermined location of the recording medium 405 determined by the controller 406.

In response to a request from the terminal linked on the network, the controller 406 drives the player 407 to play back the system stream from a predetermined position in a file in the recording medium 405.

The player 407 is controlled by the controller 406 to play back the system stream from the recording medium 405.

The network interface 408 transmits the system stream played back by the player 407 through the network to the terminal specified by the controller 406.

Alternatively, the server 450 may have only a function of the player 407 for playing back a system stream stored in the recording medium 405, and does not include the encoders 401 and 402, the system-stream generator 403, or the recorder 404 with no input for receiving the video or audio signal. The server 450 may be arranged to delete a recorded portion of the system stream stored 10 minutes earlier when the recording of the system stream continues more than 10 minutes.

An operation of the video signal playback apparatus 451 according to embodiment 2 will be explained with the server 450 provided through the network 452.

The controller 409 transmits a request for connection through the network interface 410 to the server 450 to request for delivering contents.

Upon receiving the request at the network interface 408 from the video signal playback apparatus 451, the server 450 directs the controller 406 to verify and authenticate the request, and directs the player 407 to play back the system stream of the contents from a corresponding position on the recording medium 405. The system stream is then transmitted from the network interface 408 to the video signal playback apparatus 451.

The system stream from the network interface 408 is received by the network interface 410 of the video signal playback apparatus 451, and then is transferred to the system stream decomposer 411.

The system stream of the MPEG-2 standard is divided by the system stream decomposer 411 into a video bit stream and an audio bit stream. The video bit stream is then transferred to the decoder 412 for high efficiently decoding it into an MPEG-2 video signal. More particularly, the decomposer 411 and the decoder 412 serve in a combination as a playback section for converting the video bit stream into a digital video signal.

The audio bit stream is transferred to the decoder 413 for high efficiently decoding it into an MPEG-1 audio signal.

The video signal is transferred to the OSD generator 414 for adding the window 511 to the video signal. The window 511 appears in the form of a transparent on-screen display on a display screen as overlapping a frame image of the video signal (an alpha blending format). Alternatively, the OSD generator 414 may provide the window appearing at the location of the display screen as replacing the on-screen image.

An item displayed in the window 511 will be explained referring to FIG. 5.

As shown in FIG. 5, a message "11 minutes difference" shown at the right in the window indicates a time difference between a signal reproducible position and a current playback position. When being less than one minute, the difference is expressed in seconds. When being less than 60 minutes and not less than one minute, the difference is displayed in minutes. When being not less than 60 minutes, the difference is displayed in hours. The term "difference" may be replaced by another term meaning the difference.

The message "11 minutes difference" shown in FIG. 5 indicates that the time difference between the signal reproducible position and the current playback position ranges from 11 minutes 00 second to 11 minutes 59 seconds.

The message is not limited to the above exemplary range but may represent a predetermined offset value, and, for example, The message, "11 minutes difference" may indicate that the difference ranges from 10 minutes 30 seconds to 11 minutes 30 seconds.

When the requested contents is stored in the recording medium 405 of the server 450, data of an entire recording time, i.e., a whole data amount of the contents can be transferred from the server 450 through the network 452 to the playback apparatus 451 at an initial operation for communication. Accordingly, the signal reproducible position is determined from the entire recording time of the contents.

In the case that the contents are being stored in the server 450, the entire recording time of the contents increases accordingly, and the signal reproducible position changes accordingly, In this case, the server 450 may send data indicating the signal reproducible position to the video signal playback apparatus 451 through the network 452.

In the cases that the system stream of the contents is being recorded in the server 450 and that the entire recording time exceeds a predetermined duration of time, for example, 10 minutes, if a system stream stored before 10 minutes from now is deleted, the signal reproducible time is 10 minutes A four-sided frame 512 shown in FIG. 5 represents the entire recording time. When the requested contents is stored in the recording medium 405 of the server 450, the entire recording time can be received together with information about the playback position which can be currently played back the video signal playback apparatus 451 at the initial operation for communication with the server 450. The entire recording time of the contents is the time to be played back. When the contents requested to the server 450 is being recorded, the entire recording time increases accordingly. In the case that the system stream of the contents is being recorded and exceeds a predetermined time, for example, 10 minutes, if a system stream stored before 10 minutes from now is deleted, the signal reproducible length is 10 minutes.

The current playback position is indicated by a triangle mark 513 shown in FIG. 5. More particularly, the current playback position in the entire recording time is pointed out by the top vertex of the triangle mark 513.

As described, in the video signal playback apparatus of embodiment 2, the current playback position to be notified as the time difference from the signal recording position simply, thus being acknowledged by the user easily.

Even for a server recording plural types of contents, the user can acknowledge a playback time easily.

The item displayed in the window 511 of embodiment 2 are just an example and may contain other information, such as a recording rate, a system status, or preset parameters.

While the window having a horizontally-longitudinally rectangular shape indicates the time advancing from the left to the right according to embodiment 2, the time indication may be started from the right to the left. Alternatively, the window may have a vertically-longitudinally rectangular shape with the time advancing from the upper to the lower or from the lower to the upper.

Moreover, while both the video and audio signals are processed for the recording and playing back in the apparatus of embodiment 2, they may be recorded and played back separately from each other.

The recording medium is not limited to the DVD but may be other applicable recording medium, such as a tape, a hard disk drive (HDD), or a memory.

What is claimed is:

1. A video signal recording/playback apparatus comprising:
   a recorder for recording a video signal in a recording medium;
   a player for playing back said video signal at a playback position in said recording medium while said recorder records a recording position of said video signal in said recording medium;
   a controller for calculating a time difference between said recording position and said playback position; and
   an on-screen display (OSD) generator for generating and displaying a time value corresponding to said time difference with said played video signal, and displaying the time value in all of:
   a) a first time format displaying said time value in a unit of seconds exclusive of displaying said time value in a unit of minutes and a unit of hours,
   b) a second time format displaying said time value in the unit of minutes exclusive of displaying said time value in the unit of seconds and the unit of hours, and
   c) a third time format displaying said time value in the unit of hours exclusive of displaying said time value in the unit of seconds and the unit of minutes, wherein the OSD generator:
   i) displays the time value in the first time format if said time difference is less than one minute,
   ii) displays the time value in the second time format if said time difference is less than 60 minutes and not less than 60 seconds, and
   iii) displays the time value in the third time format if said time difference being not less than 60 minutes.

2. The video signal recording/playback apparatus according to claim 1, wherein said OSD generator produces a signal indicating said time difference based on a numeral indicating said time difference and a term meaning a difference.

3. The video signal recording/playback apparatus according to claim 1, wherein said OSD generator produces a window displaying said time difference therein and combines said window with said played video signal.

4. The video signal recording/playback apparatus according to claim 3, wherein said OSD generator produces a meter for indicating a recording time of said video signal, a marking for indicating said recording position of said video signal, and a marking for indicating said playback position of said video signal which all are displayed in said window.

5. The video signal playback apparatus according to claim 1, wherein said OSD generator produces a window for displaying said time difference therein, and combines and displaying said played video signal and said window.

6. The video signal playback apparatus according to claim 5, wherein said OSD generator produces a meter displayed in said window for indicating said whole data amount of said video signal and a marking displayed in said window for indicating said playback position of said video signal.

7. A video signal playback apparatus comprising:
   a player for playing back a playback position of said video signal;
   a controller for calculating a time difference between said playback position and an end of said video signal based on said received whole data amount; and
   an on-screen display (OSD) generator for generating and displaying a time value corresponding to said time difference with said played video signal, and displaying the time value in all of:
   a) a first time format displaying said time value in a unit of seconds exclusive of displaying said time value in a unit of minutes and a unit of hours,
   b) a second time format displaying said time value in the unit of minutes exclusive of displaying said time value in the unit of seconds and the unit of hours, and
   c) a third time format displaying said time value in the unit of hours exclusive of displaying said time value in the unit of seconds and the unit of minutes, wherein the OSD generator:
   i) displays the time value in the first time format if said time difference is less than one minute,
   ii) displays the time value in the second time format if said time difference is less than 60 minutes and not less than 60 seconds, and
   iii) displays the time value in the third time format if said time difference being not less than 60 minutes.

8. The video signal playback apparatus according to claim 7, wherein said OSD generator produces a signal for displaying said time difference in a unit of seconds if said difference is less than one minute, for displaying said time difference in a unit of minutes if said difference is less than 60 minutes and not less than one minute, and for displaying said time difference in a unit of hours if said difference is not less than 60 minutes.

9. The video signal playback apparatus according to claim 7, wherein said whole data amount varies.

10. The video signal playback apparatus according to claim 7,
    wherein said external apparatus records said video signal, stores a predetermined recording time of said video signal, and deletes a time of said video signal which exceeding said predetermined time,
    wherein said network I/F receives a latest whole data amount of said video signal from said external apparatus, and
    wherein said controller calculates a time difference between said end of said video signal and said current playback position based on said latest whole data amount.

11. The video signal playback apparatus according to claim 7 comprising:
    a network interface (I/F) for receiving a video signal and a whole data amount of said video signal from an external apparatus through a network.

12. A method of recording and playing back a video signal, comprising the steps of:
    recording the video signal in a recording medium;

playing back a playback position of the video signal while recording a recording position of the video signal in the recording medium;
calculating a time difference between the recording position and the playback position; and
generating and displaying a time value corresponding to the time difference with said played video signal, and displaying the time value in all of:
  a) a first time format displaying the time value in a unit of seconds exclusive of displaying the time value in a unit of minutes and a unit of hours,
  b) a second time format displaying the time value in the unit of minutes exclusive of displaying the time value in the unit of seconds and the unit of hours, and
  c) a third time format displaying the time value in the unit of hours exclusive of displaying the time value in the unit of seconds and the unit of minutes,
wherein the time value is displayed in the:
  i) first time format if said time difference is less than one minute,
  ii) second time format if said time difference is less than 60 minutes and not less than 60 seconds, and
  iii) third time format if said time difference being not less than 60 minutes.

\* \* \* \* \*